United States Patent
Riedle

(12) 
(10) Patent No.: US 6,272,590 B1
(45) Date of Patent: Aug. 7, 2001

(54) METHOD AND SYSTEM FOR PREFETCHING SEQUENTIAL DATA IN A DATA STORAGE SYSTEM

(75) Inventor: Linda Ann Riedle, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/253,415

(22) Filed: Feb. 19, 1999

(51) Int. Cl.[7] ..................................................... G06F 12/00
(52) U.S. Cl. ........................ 711/113; 711/114; 711/137; 711/204; 711/213; 711/217; 711/219
(58) Field of Search ................................ 711/3, 111–114, 711/137, 204, 213, 217–219

(56) References Cited

U.S. PATENT DOCUMENTS

| | | | |
|---|---|---|---|
| 5,600,816 | * | 2/1997 | Oldfield et al. .................. 711/113 |
| 5,734,859 | * | 3/1998 | Yorimitsu et al. ................ 711/112 |
| 5,787,472 | * | 7/1998 | Dan et al. ......................... 711/134 |
| 5,809,560 | * | 9/1998 | Schneider ......................... 711/204 |
| 5,835,940 | * | 11/1998 | Yorimitsu et al. ................ 711/112 |

\* cited by examiner

*Primary Examiner*—Than Nguyen
(74) *Attorney, Agent, or Firm*—Bracewell & Patterson, LLP

(57) ABSTRACT

A method and system in a data storage system for reading stored data from the data storage system, where the data storage system comprises N data storage drives and an associated cache, where data and calculated parity are striped across the N data storage drives, where a stripe comprises multiple sectors on each of the N data storage drives. Data is requested from the data storage system. A determination is made of whether or not the requested data currently resides in a cache associated with the data storage system. In addition, a determination is made of whether or not the requested data sequentially follows other sectors also residing in the cache. Only the requested data is fetched into the cache if it is determined that the requested data does not reside in the cache and the requested data does not sequentially follow sectors in the cache. The requested data and a predefined block of sectors within the N data storage drives are fetched into the cache if it is determined that the requested data does not reside in the cache and the requested data sequentially follows sectors in the cache, where the fetched predetermined block of sectors sequentially follows the requested data.

15 Claims, 4 Drawing Sheets

| Read Command | Fetch Command | Cache | |
|---|---|---|---|
| 102 — Sectors 0-7 | Sectors 0-7 | 0-7 | |
| 104 — Sectors 8-15 | Sectors 8-15 | 0-15 | |
| 106 — Sectors 16-23 | Sectors 16-31 | 0-15 | 16-31 |
| 108 — Sectors 24-31 | | 0-15 | 16-31 |
| 110 — Sectors 32-39 | Sectors 32-47, 64-79 | 0-15<br>32-47<br>64-79 | 16-31 |
| 112 — Sectors 40-47 | | 0-15<br>32-47<br>64-79 | 16-31 |
| 114 — Sectors 48-55 | Sectors 48-63, 80-95 | 0-15<br>32-47<br>64-79 | 16-31<br>48-63<br>80-95 |
| 116 — Sectors 56-63 | | 0-15<br>32-47<br>64-79 | 16-31<br>48-63<br>80-95 |
| 118 — Sectors 64-71 | | 0-15<br>32-47<br>64-79 | 16-31<br>48-63<br>80-95 |
| 120 — Sectors 72-79 | | 0-15<br>32-47<br>64-79 | 16-31<br>48-63<br>80-95 |
| 122 — Sectors 80-87 | | 0-15<br>32-47<br>64-79 | 16-31<br>48-63<br>80-95 |
| 124 — Sectors 88-95 | | 0-15<br>32-47<br>64-79 | 16-31<br>48-63<br>80-95 |

*Fig. 5*

METHOD AND SYSTEM FOR PREFETCHING SEQUENTIAL DATA IN A DATA STORAGE SYSTEM

CROSS-REFERENCE TO RELATED APPLICATIONS

The present application is related to the following copending applications, which are filed on even date herewith and incorporated herein by reference:

(1) U.S. patent application Ser. No. 09/253,413; and (2) U.S. patent application Ser. No. 09/253,414.

BACKGROUND OF THE INVENTION

1. Field of the Invention

The present invention relates in general to improved data storage systems and in particular to an improved method and system for reading stored data from a data storage system. Still more particularly, the present invention relates to an improved method and system for fetching stored data is response to requested data and any previously fetched data in a cache.

2. Description of the Related Art

As the performance of microprocessor and semiconductor memory technology increases, there is a need for improved data storage systems with comparable performance enhancements. Additionally, in enhancing the performance of data storage systems, there is a need for improved reliability of data stored. In 1988, a paper was published by Patterson, Gibson, Katz, A Case for Redundant Arrays of Inexpensive Disks (RAID), International Conference on Management of Data, pgs. 109–116, June 1988. This paper laid the foundation for the use of redundant arrays of inexpensive disks that would not only improve the data transfer rate and data I/O rate over a comparable single disk access, but would also provide error correction at a lower cost in data storage systems.

RAID includes an array of disks which are typically viewed by a host, such as a computer system, as a single disk. A RAID controller may be a hardware and/or software tool for providing an interface between the host and the array of disks. Preferably, the RAID controller manages the array of disks for storage and retrieval and can view the disks of the RAID separately. The disks included in the array may be any type of data storage systems which can be controlled by the RAID controller when grouped in the array.

The RAID controller is typically configured to access the array of disks as defined by a particular "RAID level." The RAID level specifies how the data is distributed across the disk drives and how error correction is accomplished. In the paper noted above, the authors describe five RAID levels (RAID Level 1–RAID level 5). Since the publication of the paper, additional RAID levels have been designated.

RAID levels are typically distinguished by the benefits included. Three key benefits which may be included in a RAID level are fault tolerance, data availability and high performance. Fault tolerance is typically achieved through an error correction method which ensures that information can be reconstructed in the event of a disk failure. Data availability allows the data array to continue to operate with a failed component. Typically, data availability is achieved through a method of redundancy. Finally, high performance is typically achieved by simultaneous access to multiple disk drives which results in faster I/O and data transfer requests.

Error correction is accomplished, in many RAID levels, by utilizing additional parity data stored with the original data. Parity data may be utilized to recover lost data due to disk failure. Parity data is typically stored on one or more disks dedicated for error correction only, or distributed over all of the disks within an array.

By the method of redundancy, data is stored in multiple disks of the array. Redundancy is a benefit in that redundant data allows the storage system to continue to operate with a failed component while data is being replaced through the error correction method. Additionally, redundant data is more beneficial than back-up data because back-up data is typically outdated when needed whereas redundant data is current when needed.

In many RAID levels, redundancy is incorporated through data interleaving which distributes the data over all of the data disks in the array. Data interleaving is usually in the form of data "striping" in which data to be stored is broken down into blocks called "stripe units" which are then distributed across the array of disks. Stripe units are typically predefined as a bit, byte, block or other unit. Stripe units are further broken into a plurality of sectors where all sectors are an equivalent size. A "stripe" is a group of corresponding stripe units, one stripe unit from each disk in the array. Thus, "stripe size" is equal to the size of a stripe unit times the number of data disks in the array.

In an example, RAID level 5 utilizes data interleaving by striping data across all disks and provides for error correction by distributing parity data across all disks. For each stripe, all stripe units are logically combined with each of the other stripe units to calculate parity for the stripe. Logical combination is typically accomplished by an exclusive or (XOR) of the stripe units. For N physical drives, N−1 of the physical drives will receive a stripe unit for the stripe and the Nth physical drive will receive the parity for the stripe. For each stripe, the physical drive receiving the parity data rotates such that all parity data is not contained on a single disk. I/O request rates for RAID level 5 are high because the distribution of parity data allows the system to perform multiple read and write functions at the same time. RAID level 5 offers high performance, data availability and fault tolerance for the data disks.

Disk arrays are preferably configured to include logical drives which divide the physical drives in the disk array into logical components which may be viewed by the host as separate drives. Each logical drive includes a cross section of each of the physical drives and is assigned a RAID level. For example, a RAID system may include 10 physical drives in the array. The RAID system is accessible by a network of 4 users and it is desirable that each of the users have separate storage on the disk array. Therefore the physical drives will be divided into at least four logical drives where each user has access to one of the logical drives. Logical drive 1 needs to be configured to RAID level 5. Therefore, data will be interleaved across the cross sections of nine of the physical drives utilized by logical drive 1 and parity data will be stored in the cross section of the remaining physical drive.

A host computer may request data from the data storage system. Typically, data requests are divided into read commands where each read command may request a fixed amount of data. Often, read commands request sequential data by a series of read requests from the host computer for sequential portions of the data. Under standard operation, upon receiving a read command, the RAID controller will check the cache for the requested data. If the requested data is available in the cache, a cache hit is issued and the data is supplied to the host computer from the cache. However, if the requested data is not available in the cache, there is a cache miss and a SCSI command is issued to the physical drive to retrieve the requested data into the cache.

Fetching sequential data into the cache command by command is a slow means of reading data. A well known method of minimizing fetches is achieved by prefetching data. By prefetching data, the data being fetched is brought into the cache along with n additional sectors of sequential data. Many fetching routines have been developed utilizing prefetching in an attempt to increase reading speed from a data storage system. For example, in one routine, the prefetch mode is either turned on or off and the variable n is set to the active stripe size. Another routine determines the n sectors to fetch based on a cache hit ratio. For all previous methods, whether or not to fetch and how much to fetch is independent of what the current read command requests.

However, basing prefetch methods on past data and not on the requested data limits the reliability of the prefetched data. If too much data is prefetched, then other data may be prematurely pushed out of the cache. However, if too little data is prefetched, then more fetches may be required to perform a sequence of reads. Additionally, if the current read request is not sequential, unnecessary time may be utilized to prefetch data that will not be necessary for the next request. It should therefore be apparent that an improved method and system is needed for reliably fetching data such that the number of fetches in a sequential fetching sequence is minimized and such that data is prefetched to the cache in response to the current read request. In addition, such a method should constrain the amount of data prefetched for non-sequential fetching.

SUMMARY OF THE INVENTION

It is therefore one object of the present invention to provide an improved data storage system.

It is another object of the present invention to provide an improved method and system for reading stored data from a data storage system.

It is yet another object of the present invention to provide an improved method and system for fetching stored data in response to requested data and any previously fetched data in a cache.

The foregoing objects are achieved as is now described. The method and system of the present invention may be utilized in a data storage system for reading stored data from the data storage system, where the data storage system comprises N data storage drives and an associated cache, where data and calculated parity are striped across the N data storage drives, where a stripe comprises multiple sectors on each of the N data storage drives. Initially, data is requested from the data storage system. The cache is examined to determine if the requested data currently resides in the cache. In addition, the cache is also examined to determine if the requested data sequentially follows other sectors residing in the cache. Only the requested data is fetched into the cache if it is determined that the requested data does not reside in the cache and the requested data does not sequentially follow other sectors in the cache. The requested data and a predefined block of sectors within the N data storage drives are fetched into the cache if it is determined that the requested data does not reside in the cache and the requested data sequentially follows other sectors in the cache, where the fetched predetermined block of sectors sequentially follows the requested data.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

FIG. 5 depicts a pictorial illustration of the data fetched into a cache in response to read commands received by a data storage system according the to the method and system of the present invention.

DESCRIPTION OF THE PREFERRED EMBODIMENT

Figure 1:
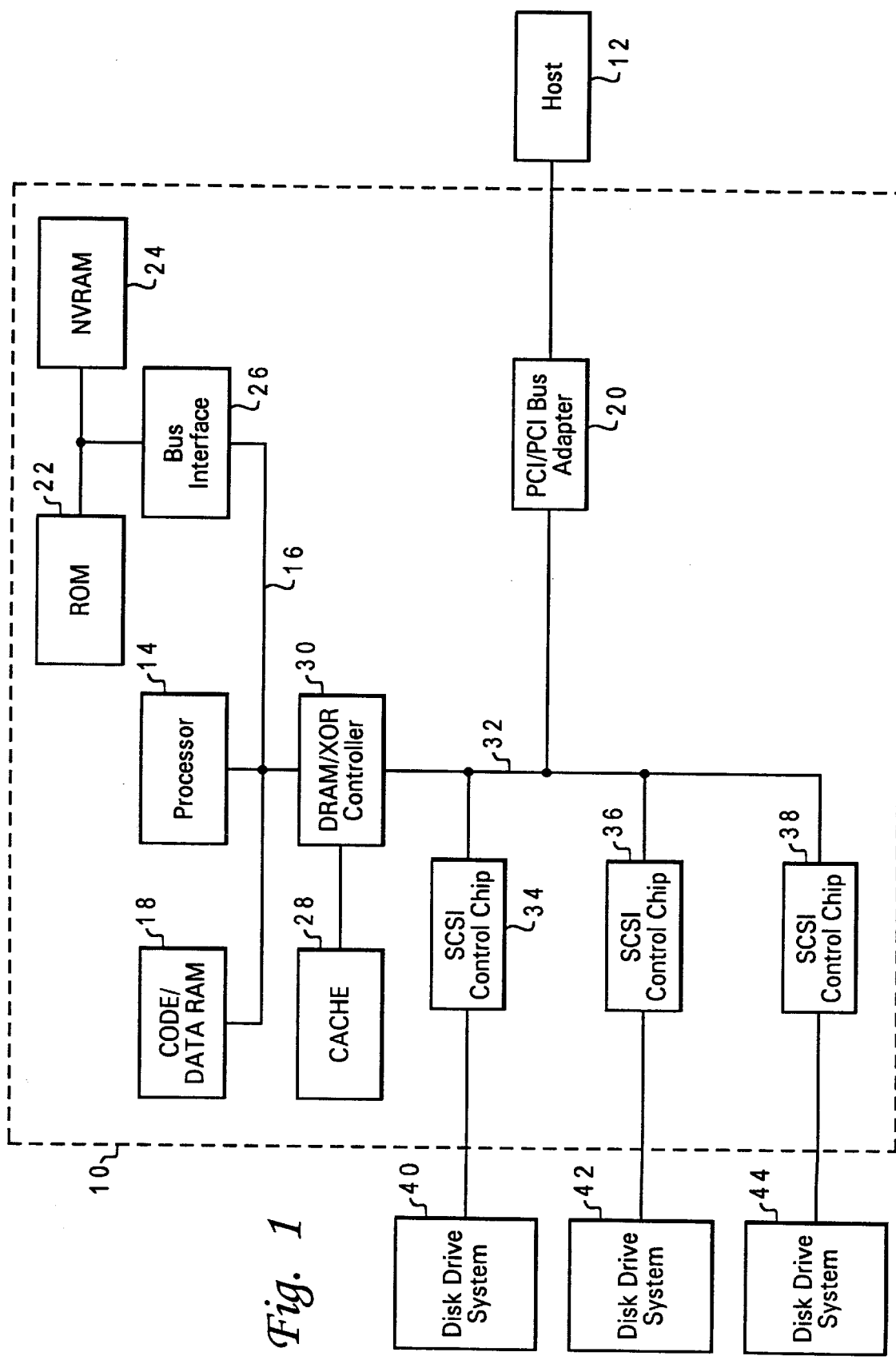
FIG. 1 depicts a high level block diagram of a data storage system which may be utilized according to the method and system of the present invention.

With reference now to the figures and in particular with reference to FIG. 1, there is depicted a high level block diagram of a RAID data storage system which may be utilized to implement the present invention. As depicted, RAID data storage system 10 is coupled to host processor 12 via PCI/PCI bus adapter 20. The data storage system 10 and host processor 12 may be incorporated in a single hardware unit, such as a data processing system (not shown). Alternatively, data storage system 10 may be incorporated into one hardware unit and host processor 12 may be incorporated into another hardware unit, such as the data processing system.

Host processor 12 may be implemented in a variety of data processing systems under a number of different operating systems. The data processing systems may be, for example, a personal computer, a mini-computer, or a mainframe computer. The data processing systems may be a stand-alone system or part of a network such as a local area network (LAN) or a wide area network (WAN).

As illustrated, processor 14 is utilized to control data storage system 10 which is preferably a RAID data storage system. Processor 14 is preferably an advanced microprocessor which is coupled to processor bus 16. As depicted, also coupled to processor bus 16 is code/data RAM 18 which is utilized to temporarily store code and data utilized by processor 14. Processor 14 interacts with RAM 18 to read and execute read commands from host processor 12 stored in RAM. ROM 22 and non-volatile random access memory (NVRAM) 24 are typically accessed utilizing an 8 bit bus and thus bus interface 26 is utilized to interface those devices to processor bus 16, which typically utilizes a 32 bit bus.

Operational code is typically stored within ROM 22, which, as those skilled in the art will appreciate, is generally provided utilizing so-called "flash" ROM. Operational code is thereafter fetched from ROM 22 by processor 14 upon initiation of operation to direct the operation of processor 14 to perform functions including the functions of the present invention. NVRAM 24 is typically a low power CMOS memory which is powered up for "back-up" by a battery such that the information stored in NVRAM 24 will not be lost when main power is terminated. Thus, NVRAM 24 may be utilized to store configuration data or operational code in a manner similar to that stored within ROM 22. ROM 22 is generally updated at initial power application and any changes to system configuration during operation are stored within NVRAM 24 and then entered into a "device change list" which is also stored within NVRAM 24 and on each disk drive within the system.

A cache 28 is also provided which is coupled to DRAM/XOR controller 30. Cache 28 may be configured into multiple temporary storage positions where each temporary storage position may be referred to as a page of cache 28. DRAM/XOR controller 30 is utilized to control access to random access memory and also provides a hardware implemented exclusive or (XOR) circuit which may be utilized to rapidly and efficiently calculate parity for changes in updated data.

DRAM/XOR controller 30 is coupled to local bus 32. Also coupled to local bus 32 are multiple small computer system interface (SCSI) control chips 34, 36 and 38. Each SCSI control chip 34, 36 and 38 is defined as including channels which may each support a disk drive storage system comprising multiple disks. Those having ordinary skill in this art will appreciate that alternative bus architectures may be utilized to implement the data storage system; however, the depicted embodiment of the present invention utilizes multiple disk drive data storage systems 40, 42 and 44 which are configured in the SCSI bus architecture.

Figure 2:
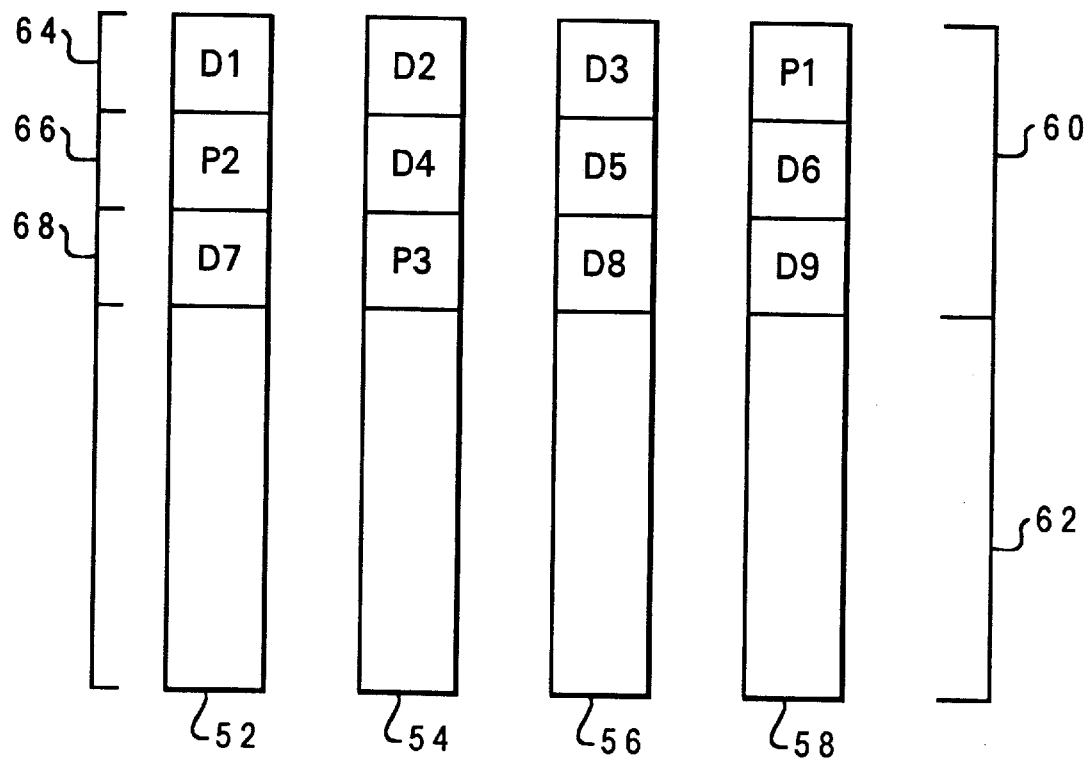
FIG. 2 illustrates a pictorial image of a RAID disk storage system according to the method and system of the present invention.

Referring now to FIG. 2, there is illustrated a pictorial image of a RAID disk drive system of the present invention. In the example shown, four physical drives 52, 54, 56 and 58 are depicted. A logical drive is distinguished as a cross section of the four physical drives 52, 54, 56 and 58 as illustrated at reference numeral 60. The remainder of the physical drives 52, 54, 56 and 58 depicted at reference numeral 62 may contain a plurality of stripes and/or distinguished logical drives. Three stripes are illustrated at reference numerals 64, 66, and 68 within the logical drive depicted at reference numeral 60. The portion of the cross section of each physical drive is a stripe unit. Each stripe unit includes a number of sectors dependent upon the size of the stripe unit.

For a RAID-5 data disk system shown, for the logical disk depicted at reference numeral 60, each stripe includes three stripe units of data which are labeled with a "D" and a stripe unit of parity which is labeled with a "P". The stripe depicted at reference numeral 64 includes stripe units D1, D2, D3, and P1. The stripe illustrated at reference numeral 66 includes stripe units D4, D5, D6 and P2. The stripe depicted at reference numeral 68 includes stripe units D7, D8, D9 and P3. For other RAID levels, the distribution of data and parity will conform to the level specifications.

Sequences of stripe units may be classified by logical drives or by physical drives. In addition, stripe units may be classified as containing data or parity. For example, for stripe unit D4, the preceding logical data stripe unit is D3 and the next logical data stripe unit is D5. In addition, for the stripe unit D4, the preceding physical data stripe unit is D2 and the next physical parity stripe unit is P3.

Figure 3:
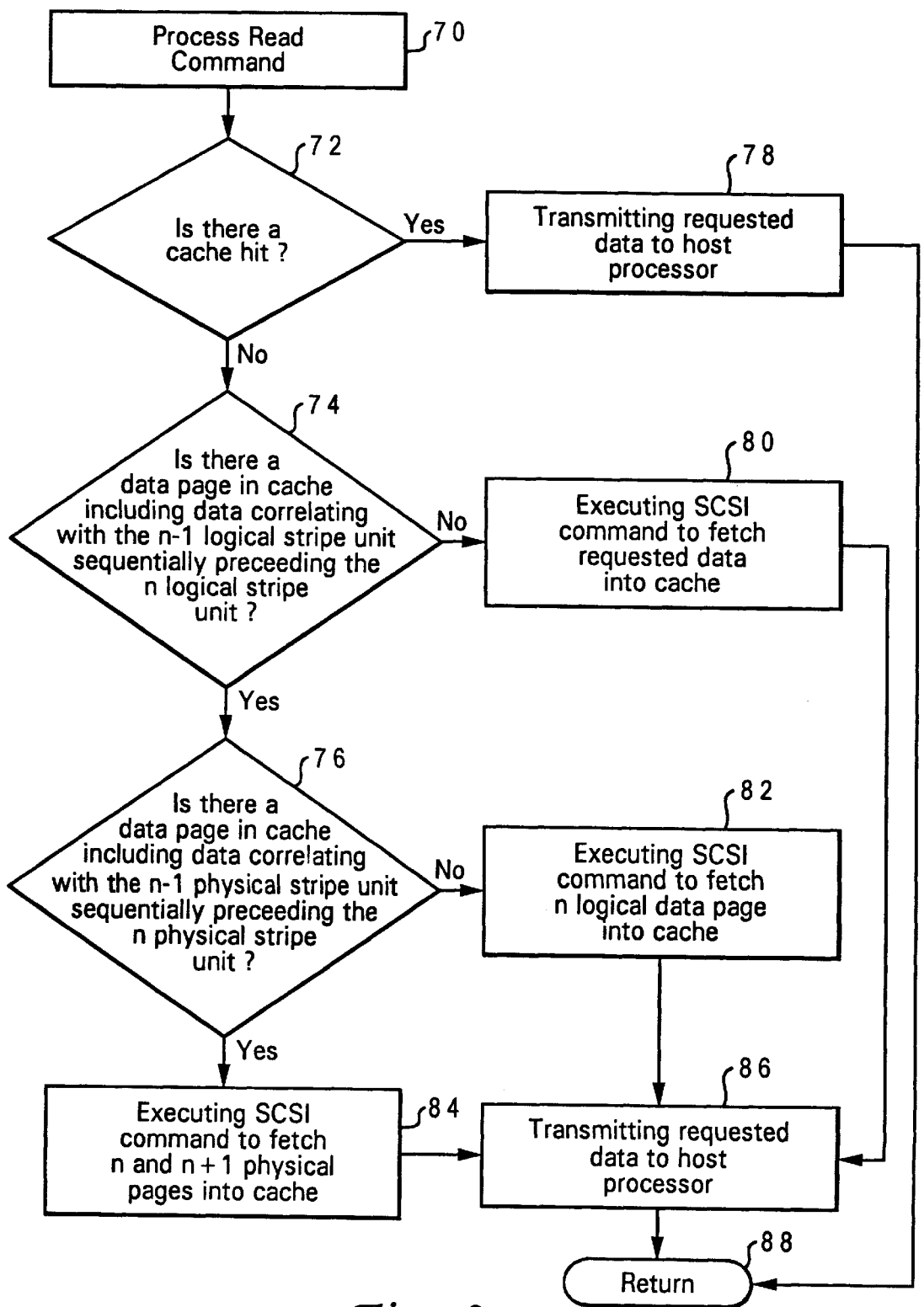
FIG. 3 depicts a high level logic flowchart which illustrates the method of the present invention according to the method and system of the present invention.

With reference now to FIG. 3, there is depicted a high level logic flowchart which illustrates the method of the present invention. It should be appreciated by those skilled in the art that FIG. 3 represents a self-consistent sequence of steps leading to a desired result. The steps are those requiring physical manipulation of physical quantities. Usually, although not necessarily, these quantities take the form of electrical or magnetic signals capable of being stored, transferred, combined, compared and otherwise manipulated. It has proven convenient at times by those skilled in the art to refer to these signals as bits, values, elements, symbols, characters, terms, numbers or the like. It should be born in mind, however, that all of these and similar terms are to be associated with the appropriate physical quantities and are merely convenient labels applied to those quantities.

Further, the manipulations performed are often referred to as terms, such as adding or comparing, which are commonly associated with mental operations performed by a human operator. No such capability of a human operator is necessary or desirable in most cases in any of the operations described herein which form part of the present invention; the operations are machine operations. Useful machines for performing operations of a preferred embodiment of the present invention include data processing systems such as general purpose digital computers or other similar devices. In all cases the distinction between the method operations and operating a computer and the method of computation itself should be born in mind. The present invention relates to method steps for operating a processor such as processor 14 of FIG. 1, in processing electrical or other physical signals to generate desired physical signals. In the method steps following, a reference to "N" is a substitute for the data stripe unit name where the "N−1" data stripe unit sequentially precedes the N data stripe unit and the N data stripe unit sequentially precedes the "N+1" data stripe unit. In addition, the N data stripe unit contains the requested data. As illustrated, the process described in FIG. 3 begins at block 70 and thereafter passes to block 72. A plurality of triggers in the operation of processor 14 may trigger the process which begins at block 70.

Block 72 depicts a determination of whether or not there is a cache hit to data requested in a read command. A cache hit indicates that the requested data resides in the cache. If there is a cache hit determined at block 72, then the process passes to block 78. Block 78 illustrates the transmitting of data from the cache to the host processor. Thereafter, the process passes from block 72 to block 88 and returns as illustrated at block 88. However, in the event that, as illustrated at block 72, a cache hit does not occur, then the process passes to block 74. Block 74 depicts a determination of whether or not there is a page of data residing in the cache which corresponds with the N−1 logical data stripe unit sequentially preceding the N logical data stripe unit. The page of data including the preceding data includes at least one sector of the N−1 logical data stripe unit. The requested data may be a sector in the N data stripe unit, or may be a sequence of sectors in the N data stripe unit.

With reference still to block 74, if there is not a page of data residing in the cache which corresponds with the N−1 logical data stripe unit sequentially preceding the N logical data stripe unit then the process passes to block 80. Block 80 illustrates the executing of a SCSI command to fetch the requested data into cache. Thereafter, the process passes to block 86. Block 86 depicts the transmitting of the requested data to the host processor whereafter the process returns. Otherwise, in the event that there is a page residing in the cache which corresponds with the N−1 logical data stripe unit sequentially preceding the N logical data stripe unit at block 74, the process passes to block 76.

Block 76 illustrates the determination of whether or not there is a page of data residing in the cache including data correlating with the N−1 physical data stripe unit sequentially preceding the N physical data stripe unit which includes the requested data. The page of data including the preceding data includes at least one sector of the N−1 physical data stripe unit. The requested data may be a sector in the N data stripe unit, or may be a sequence of sectors in the N data stripe unit.

With reference still to block 76, if there is not a page of data residing in the cache including data correlating with the N−1 physical data stripe unit sequentially preceding the N physical data stripe unit, then the process passes to block 82. Otherwise, at block 76, the process passes to block 84. Block 82 depicts the executing of a SCSI command to fetch the N logical data stripe unit including the requested data into a page in cache. Block 84 illustrates the executing of a SCSI command to fetch N and N+1 physical data stripe units into pages in cache, whereby sequentiality of data is anticipated. After blocks 82 and 84, the process passes to block 86. Block 86 depicts the transmitting of requested data to host processor whereafter the process returns as depicted at block 88.

Figure 4:
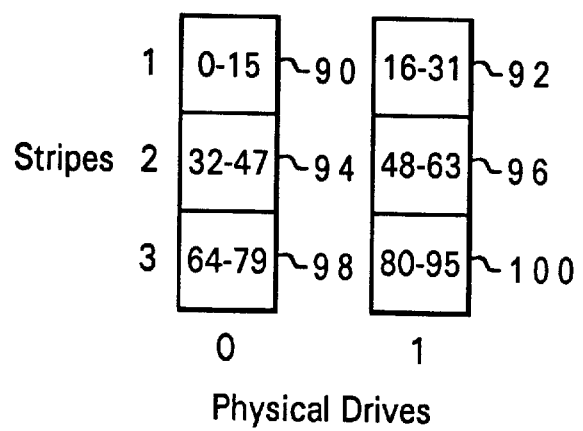
FIG. 4 illustrates a two physical drive data storage system with three stripes according to the method and system of the present embodiment for demonstrating the method of FIG. 3 in conjunction with FIG. 5

Referring now to FIG. 4, there is illustrated a two physical drive data storage system with three stripes according to the method and system of the present invention for demonstrating the method of FIG. 3 in conjunction with FIG. 5. Each stripe includes two data stripe units as is typical in a RAID-0 data storage system. In addition, no parity is included in the example of FIG. 4, however other RAID levels which include parity may utilize the method and system of the present invention including the RAID-5 data storage system illustrated in FIG. 3. Each data stripe unit includes numerical representations of the logical sectors contained within each data stripe unit. The first data stripe unit is illustrated at reference numeral 90 containing logical sectors 0–15. Afterward, the second data stripe unit is depicted at reference numeral 92 containing logical sectors 16–31. Next, the third data stripe unit is illustrated at reference numeral 94 including logical sectors 32–47. Afterward, the fourth data stripe unit is depicted at reference numeral 96 containing logical sectors 48–63. Next, the fifth data stripe unit is illustrated at reference numeral 98 including sectors 64–79. Finally, the sixth data stripe unit is depicted at reference numeral 100 containing sectors 80–95.

With reference to FIG. 5, there is depicted a pictorial illustration of the data fetched into a cache in response to read commands received by a data storage system according to the method and system of the present invention. The data is sequentially read from the data storage system depicted in FIG. 4 for the purpose of example. In the example, 4K byte reads are performed whereby eight sectors of data may be requested per read command.

Referring still to FIG. 5, the first read command requests sectors 0–7 as illustrated at reference numeral 102. Since no data initially resides in the pages of the cache, a cache miss is issued. In addition, since no data initially resides in the pages of the cache, there is no data sequentially preceding the requested data in the cache. Therefore, a SCSI command is issued for sectors 0–7 to be fetched into the cache. Thereafter, the cache contains a data page including sectors 0–7. Next, a read command for sectors 8–15 is received as depicted at reference numeral 104. Since sectors 8–15 do not reside in the cache, there is a cache miss. In addition, since there is not a page containing sectors from the previous logical stripe unit, there is not any data which sequentially precedes sectors 8–15. Therefore, a SCSI command is issued for sectors 8–15 to be fetched into the cache. Thereafter, the cache contains a data page including sectors 0–15.

With reference still to FIG. 5, the third read command requests sectors 16–23 as illustrated at reference numeral 106. In FIG. 4, sectors 16–23 are in the logical data stripe unit depicted at reference numeral 92 following the logical data stripe unit illustrated at reference numeral 90 containing sectors 0–15. Since a page in the cache contains sectors 1–15, the entire logical data stripe unit illustrated at reference numeral 92 which includes sectors 16–31 is fetched into the cache. Thereafter, the cache contains a page including sectors 0–15 and a page including sectors 16–31. The next read command requests sectors 24–31 as depicted at reference numeral 108. These sectors are already in the cache and therefore a cache hit is issued. Upon a direct cache hit, the requested data from the cache may be transmitted from the cache to the host processor without first fetching the data into the cache.

Referring still to FIG. 5, the fifth read command requests sectors 32–39 as illustrated at reference numeral 110. In FIG. 4, sectors 32–39 are in the physical data stripe unit depicted at reference numeral 94 following the physical data stripe unit illustrated at reference numeral 90 containing sectors 0–15. Since sectors 32–39 are not already in the cache and sectors 0–15 and 16–31 are in the cache, the entire data stripe unit depicted at reference numeral 94 which includes sectors 32–47 will be fetched into the cache. In addition, the entire data stripe unit illustrated at reference numeral 98 containing sectors 64–79 is also fetched into the cache. Thereafter, the cache contains pages with sectors 0–15, 16–31, 32–47 and 64–79. Following, the sixth read command requests sectors 40–47 as depicted at reference numeral 112. Since sectors 4047 are already in cache, there is a cache hit and the requested data is directly transmitted to the host processor.

With reference still to FIG. 5, the seventh read command requests sectors 48–55 as illustrated at reference numeral 114. In FIG. 4, sectors 48–55 are in the physical stripe unit depicted at reference numeral 96 following the physical data stripe unit depicted at reference numeral 92 containing sectors 16–31. Since sectors 48–55 are not already in cache and sectors 16–31 and 32–47 are in cache, the entire data stripe unit depicted at reference numeral 96 which includes sectors 48–63 will be fetched into the cache. In addition, the data entire stripe unit illustrated at reference numeral 100 containing sectors 80–95 is also fetched into the cache. Thereafter the cache contains pages with sectors 0–15, 16–31, 32–47, 48–63, 64–79, and 80–95. Following the last fetch described, the cache contains all the data sectors for the physical drives illustrated in FIG. 4. When the sequential data is requested as illustrated at reference numerals 116, 118, 120, 122 and 124, the requests for sectors 56–63, 64–71, 72–79, 80–87 and 88–95 are all cache hits. The read time for these sector requests is substantially reduced from the time which would be taken if each set of sectors was independently fetched.

While the invention has been particularly shown and described with reference to a preferred embodiment, it will be understood by those skilled in the art that various changes in form and detail may be made therein without departing from the spirit and scope of the invention. For example, although aspects of the present invention have been described with respect to a data storage system executing software that directs the method of the present invention, it should be understood that the present invention may alternatively be implemented as a computer program product for use with a data storage system or computer system. Programs defining the functions of the present invention can be delivered to a data storage system or computer system via a variety of signal-bearing media, which include, without limitation, non-writable storage media (e.g. CD-ROM), writable storage media (e.g. a floppy diskette or hard disk drive), and communication media, such as computer and telephone networks including ethernet. It should be understood, therefore, that such signal-bearing media, when carrying or encoding computer readable instructions that direct the method functions of the present invention, represent alternative embodiments of the present invention.

What is claimed is:

1. A method in a data storage system for reading stored data from said data storage system, where said data storage system comprises M data storage drives and an associated cache, where data and calculated parity are striped across said M data storage drives, where a stripe comprises a plurality of sectors on each of said M data storage drives, said method comprising the steps of:

requesting data from said data storage system;

determining if said requested data resides in a cache and if said requested data sequentially follows a plurality of sectors also residing in said cache;

fetching only said requested data into said cache if it is determined that said requested data does not reside in said cache and said requested data does not sequentially follow a plurality of sectors also residing in said cache; and fetching a predefined block of sectors including said requested data from said M data storage drives into said cache if it is determined that said requested data does not reside in said cache and said requested data does sequentially follow a plurality of sectors also residing in said cache, where said fetched predefined block of sectors sequentially follows said requested data.

2. The method for reading stored data from said data storage system according to claim 1, further comprising the step of:

transmitting said requested data from said cache to a host.

3. The method for reading stored data from said data storage system according to claim 1, wherein said step of fetching a predefined block of sectors including said requested data from said M data storage drives into said cache if it is determined that said requested data does not reside in said cache and said requested data does sequentially follow a plurality of sectors residing in said cache, where said fetched predefined block of sectors sequentially follows said requested data, further comprises the steps of:

fetching all sectors of an N logical data stripe unit which includes said requested data if said plurality of sectors residing in said cache which said requested data sequentially follows are sectors from an N−1 logical data stripe unit; and fetching all sectors of N and N+1 physical data stripe units where said N data stripe unit includes said requested data if said plurality of sectors residing in said cache which said requested data sequentially follows are sectors from an N−1 physical data stripe unit.

4. A method in a RAID data storage system for reading stored data from said RAID data storage system, where said RAID data storage system comprises M data storage drives and an associated cache, where data and calculated parity are striped across said M data storage drives, where a stripe comprises a plurality of sectors on each of said M data storage drives, said method comprising the steps of:

requesting data from said RAID data storage system;

determining if said requested data resides in a cache and if said requested data sequentially follows a plurality of sectors also residing in said cache;

fetching only said requested data into said cache if it is determined that said requested data does not reside in said cache and said requested data does not sequentially follow a plurality of sectors also residing in said cache; and fetching a predefined block of sectors including said requested data from said M data storage drives into said cache if it is determined that said requested data does not reside in said cache and said requested data does sequentially follow a plurality of sectors also residing in said cache, where said fetched predefined block of sectors sequentially follows said requested data.

5. The method for reading stored data from said RAID data storage system according to claim 4, further comprising the step of:

transmitting said requested data from said cache to a host.

6. The method for reading stored data from said RAID data storage system according to claim 4, wherein said step of fetching a predefined block of sectors including said requested data from said M data storage drives into said cache if it is determined that said requested data does not reside in said cache and said requested data does sequentially follow a plurality of sectors residing in said cache, where said fetched predefined block of sectors sequentially follows said requested data, further comprises the steps of:

fetching all sectors of an N logical data stripe unit which includes said requested data if said plurality of sectors also residing in said cache which said requested data sequentially follows are sectors from an N−1 logical data stripe unit; and fetching all sectors of N and N+1 physical data stripe units where said N data stripe unit includes said requested data if said plurality of sectors also residing in said cache which said requested data sequentially follows are sectors from an N−1 physical data stripe unit.

7. A system in a data storage system for reading stored data from said data storage system, where said data storage system comprises M data storage drives and an associated cache, where data and calculated parity are striped across said M data storage drives, where a stripe comprises a plurality of sectors on each of said M data storage drives, said system comprises:

means for requesting data from said data storage system;

means for determining if said requested data resides in a cache and if said requested data sequentially follows a plurality of sectors also residing in said cache;

means for fetching only said requested data into said cache if it is determined that said requested data does not reside in said cache and said requested data does not sequentially follows a plurality of sectors also residing in said cache; and means for fetching a predefined block of sectors including said requested data from said M data storage drives into said cache if it is determined that said requested data does not reside in said cache and said requested data does sequentially follow a plurality of sectors also residing in said cache, where said fetched predefined block of sectors sequentially follows said requested data.

8. The system for reading stored data from said data storage system according to claim 7, said system further comprising:

means for transmitting said requested data from said cache to a host.

9. The system for reading stored data from said data storage system according to claim 7, wherein said means for fetching a predefined block of sectors including said requested data from said M data storage drives into said cache if it is determined that said requested data does not reside in said cache and said requested data does sequentially follow a plurality of sectors residing in said cache, where said fetched predefined block of sectors sequentially follows said requested data, further comprises:

means for fetching all sectors of an N logical data stripe unit which includes said requested data if said plurality of sectors also residing in said cache which said requested data sequentially follows are sectors from an N−1 logical data stripe unit; and means for fetching all sectors of N and N+1 physical data stripe units where said N data stripe unit includes said requested data if said plurality of sectors also residing in said cache which said requested data sequentially follows are sectors from an N−1 physical data stripe unit.

10. A system in a RAID data storage system for reading stored data from said RAID data storage system, where said RAID data storage system comprises M data storage drives and an associated cache, where data and calculated parity are striped across said M data storage drives, where a stripe comprises a plurality of sectors on each of said M data storage drives, said system comprises:

means for requesting data from said RAID data storage system;

means for determining if said requested data resides in a cache and if said requested data sequentially follows a plurality of sectors also residing in said cache;

means for fetching only said requested data into said cache if it is determined that said requested data does not reside in said cache and said requested data does not sequentially follow a plurality of sectors also residing in said cache; and means for fetching a predefined block of sectors including said requested data from said M data storage drives into said cache if it is determined that said requested data does not reside in said cache and said requested data does sequentially follow a plurality of sectors also residing in said cache, where said fetched predefined block of sectors sequentially follows said requested data.

11. The system for reading stored data from said RAID data storage system according to claim 10, said system further comprising:

means for transmitting said requested data from said cache to a host.

12. The system for reading stored data from said RAID data storage system according to claim 10, wherein said means for fetching a predefined block of sectors including said requested data from said M data storage drives into said cache if it is determined that said requested data does not reside in said cache and said requested data does sequentially follow a plurality of sectors residing in said cache, where said fetched predefined block of sectors sequentially follows said requested data, further comprises:

means for fetching all sectors of an N logical data stripe unit which includes said requested data if said plurality of sectors also residing in said cache which said requested data sequentially follows are sectors from an N−1 logical data stripe unit; and means for fetching all sectors of N and N+1 physical data stripe units where said N data stripe unit includes said requested data if said plurality of sectors also residing in said cache which said requested data sequentially follows are sectors from an N−1 physical data stripe unit.

13. A program product for fetching data into a cache associated with a data storage system, where said data storage system comprises M data storage drives and an associated cache, where data and calculated parity are striped across said M data storage drives, where a stripe comprises a plurality of sectors on each of said M data storage drives, said program product comprising:

a data processing system usable medium; and a data fetching program encoded within said data processing system usable medium that, in response to receiving a request for data from said data storage system, determines if said requested data resides in a cache and if said requested data sequentially follows a plurality of sectors also residing in said cache, fetches only said requested data into said cache if it is determined that said requested data does not reside in said cache and said requested data does not sequentially follow a plurality of sectors also residing in said cache; and fetches a predefined block of sectors including said requested data from said M data storage drives into said cache if it is determined that said requested data does not reside in said cache and said requested data does sequentially follow a plurality of sectors also residing in said cache, where said fetched predefined block of sectors sequentially follows said requested data.

14. The program product of claim 13, wherein said data fetching program transmits said requested data from said cache to a host.

15. The program product of claim 13, wherein said data fetching program:

fetches all sectors of an N logical data stripe unit which includes said requested data if said plurality of sectors also residing in said cache which said requested data sequentially follows are determined to be sectors from an N−1 logical data stripe unit;

fetches all sectors of N and N+1 physical data stripe units where said N data stripe unit includes said requested data if said plurality of sectors also residing in said cache which said requested data sequentially follows are determined to be sectors from an N−1 physical data stripe unit.

* * * * *